US009160705B2

(12) United States Patent
Laubner et al.

(10) Patent No.: US 9,160,705 B2
(45) Date of Patent: Oct. 13, 2015

(54) IDENTIFIER MANAGEMENT

(71) Applicant: Hewlett-Packard Development Company, L.P., Houston, TX (US)

(72) Inventors: Guido Laubner, Kroeppelshagen (DE); Swamy Jagannadha Mandavilli, Fort Collins, CO (US); Robert Lovejoy Raymond, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 269 days.

(21) Appl. No.: 13/960,747

(22) Filed: Aug. 6, 2013

(65) Prior Publication Data

US 2015/0046590 A1     Feb. 12, 2015

(51) Int. Cl.
   *G06F 15/173*    (2006.01)
   *H04L 29/12*    (2006.01)
   *H04L 29/06*    (2006.01)

(52) U.S. Cl.
   CPC ............... *H04L 61/20* (2013.01); *H04L 61/15* (2013.01); *H04L 63/00* (2013.01)

(58) Field of Classification Search
   CPC ............ G06F 17/5045; H04L 12/4633; H04L 2212/0025; H04L 29/12216; H04L 29/12801
   USPC .......................................................... 370/8
   See application file for complete search history.

(56) References Cited

U.S. PATENT DOCUMENTS

| | | | |
|---|---|---|---|
| 6,148,342 A * | 11/2000 | Ho | 709/225 |
| 6,236,971 B1 * | 5/2001 | Stefik et al. | 705/54 |
| 6,442,549 B1 * | 8/2002 | Schneider | 1/1 |
| 6,856,800 B1 * | 2/2005 | Henry et al. | 455/411 |
| 7,174,456 B1 * | 2/2007 | Henry et al. | 713/158 |
| 7,653,714 B2 | 1/2010 | Yagishita | |
| 8,037,106 B2 | 10/2011 | Barrenechea | |
| 8,255,485 B2 | 8/2012 | Martinez et al. | |
| 8,312,419 B2 | 11/2012 | Wilcock et al. | |
| 2001/0014917 A1 * | 8/2001 | Ishiyama et al. | 709/227 |
| 2002/0152180 A1 * | 10/2002 | Turgeon | 705/72 |
| 2005/0149759 A1 * | 7/2005 | Vishwanath et al. | 713/201 |
| 2009/0276771 A1 * | 11/2009 | Nickolov et al. | 717/177 |
| 2010/0115490 A1 * | 5/2010 | Wilcock et al. | 717/104 |
| 2010/0205304 A1 * | 8/2010 | Chaturvedi et al. | 709/226 |
| 2011/0196940 A1 * | 8/2011 | Martinez et al. | 709/217 |
| 2012/0170749 A1 * | 7/2012 | Rich et al. | 380/277 |
| 2012/0266156 A1 | 10/2012 | Spivak et al. | |
| 2013/0044878 A1 * | 2/2013 | Rich et al. | 380/277 |

OTHER PUBLICATIONS

Extreme Networks, Ridgeline Network and Service Management, 2013, 2 pages, http://www.extremenetworks.com/products/Ridgeline.aspx.

IBM, Tivoli Service Automation Manager Version 7.2.2, Jul. 2011, 98 pages, http://pic.dhe.ibm.com/infocenter/tivihelp/v10r1/topic/com.ibm.tsam_7.2.2.doc/out/tsam.ug.

* cited by examiner

*Primary Examiner* — Peling Shaw

(74) *Attorney, Agent, or Firm* — International IP Law Group, P.C.

(57) ABSTRACT

A method for managing identifiers can include receiving, in an identifier management system, a request for an identifier in a computing system. The method can also include verifying availability of the identifier. The method can further include returning an affirmative response to a requesting party.

20 Claims, 7 Drawing Sheets

600

IDENTIFIER MANAGEMENT

BACKGROUND

Information Technology (IT) systems, such as cloud computing systems, include a variety of identifiers, such as license keys and IP addresses. These identifiers can be allocated to a device upon request. Allocation of identifiers to devices can be tracked by a system engineer.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

Embodiments disclosed herein provide techniques for managing identifiers in an IT system. The term "identifier" refers to an arbitrary string of a predetermined fixed maximum length meant to describe a piece of information to install or configure a system. Examples of identifiers can include domain name system (DNS) Host names, virtual local area network (VLAN) tags, IP addresses, virtual machine names, logical unit number (LUN) names, license keys, etc. An identifier can be prepopulated (i.e., created before a request for the identifier is made) or the identifier can be generated in response to a request, and can be limited or unlimited.

In today's operations, system engineers maintain a number of identifiers. The identifier information is typically maintained in spreadsheets, or as a well structured machine usable form. However, while the existence of the identifier is managed, the lifecycle of the identifier is not managed. The lifecycle of the identifier includes creation, deletion, allocation, release, and re-use of the identifier. Lifecycle information is used in manual provisioning cycles, even if an automated system is used to perform the provisioning. As a result, provisioning occurs with human intervention/contribution and is subject to error, as well as being time consuming and introducing delays. Because of the dependence of provisioning on human intervention, a provisioning system cannot be completely automated.

An automated identifier management system can be introduced to define, store, report, and manage lifecycles of identifiers. The identifiers can be maintained in a generalized form of strings with an associated type that discriminates the use of the identifier. For example, an identifier "345" can be attributed a type of VLAN tag and the string 345 can be attributed with a type of an access list number. Often, identifiers cannot exist in duplicate in the same context. For example, VLAN ID 345 cannot exist twice in the same layer-2 network. The identifier management system maintains a state for identifiers so that the identifier is not in use twice at the same time, but can be re-used once released from a previous use.

By introducing an identifier management system, identifier maintenance can be automated and human maintenance of identifiers can be eliminated. The identifier management system can be integrated with workflow systems and other automation systems, providing a fully automated service for identifier provisioning. As a result, multiple entities can be provisioned with a single provisioning request, the element of human error is removed, and delays are reduced or eliminated.

Figure 1:
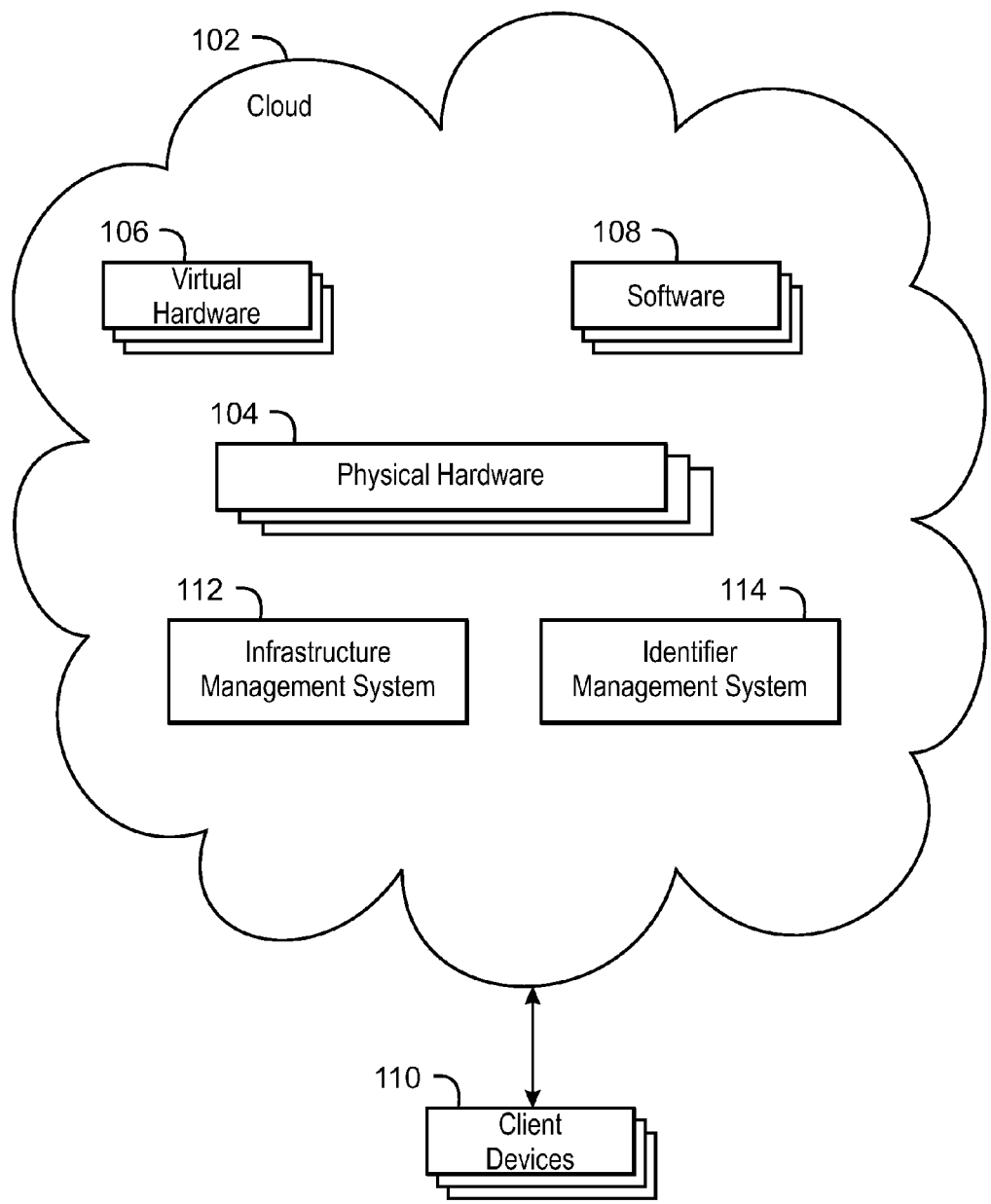
FIG. 1 is a block diagram of an example of a cloud computing system with an identifier management system.

FIG. 1 is a block diagram of an example of a cloud computing system with an identifier management system. The cloud computing system 100 can be a public system, a community system, a hybrid system, a private system, or some combination of systems. In an example, a cloud computing system 100 includes a cloud 102 including a combination of physical hardware 104, virtual hardware 106, and software 108. The cloud computing system 100 also includes a client 110. The cloud computing system 100 may include a single client device 110 or multiple client devices 110. The client device 110 can be a desktop computer, a laptop computer, a tablet computer, a cellular phone, such as a smartphone, or any other suitable device. The client device 110 can be coupled to the cloud 102 via a wired connection or a wireless connection. In an example, the client device 110 is coupled to the cloud 102 via an Ethernet connection, a WLAN connection, a LAN connection, or any other suitable connection method. In an example, the cloud 102 receives service requests from a client 110 and returns a service result to the client.

A cloud computing system 100 is a system in which multiple pieces of hardware and software are utilized over a network to perform specific computing tasks. The combination of physical hardware 104, virtual hardware 106, and software 108 is often referred to as the cloud 102. The cloud symbol is often used to represent the abstraction of a network.

Physical hardware 104 can include processors, memory devices, and networking equipment, among others. The physical hardware 104 performs the actual computing and processing required by the cloud computing system 100. For example, the physical hardware 104 performs a computation requested by a client device 110.

Virtual hardware 106 is a type of software that is processed by physical hardware 104 but is designed to emulate a specific set of hardware. For example, a particular piece of software is designed to be run by a specific type of hardware. By running virtual hardware 106 on top of the physical hardware 104, a given piece of hardware can run software designed for many different types of hardware.

Software 108 can be defined as a set of instructions and data configured to cause a processor to perform specific processes. These processes can be used for running applications which are made available to an end user. Software is designed to operate with specific hardware architecture. Hardware architecture can indicate the format of the processor instructions. Thus, one benefit of using virtual hardware is that multiple different hardware components can all operate the same software.

The physical hardware 104, virtual hardware 106, and the software 108 associated with the cloud can be configured to receive service requests from a client device 110. The cloud computing system 100 can then perform the desired processes and return the result to the client device 110.

The cloud computing system 100 can also include an infrastructure management system 112. The infrastructure management system 112 is responsible for managing the computing identifiers of the cloud computing system 100. For example, infrastructure management system 112 creates new virtual hardware 106 emulated by physical hardware 104 and installs software 108 on either physical hardware 104 or virtual hardware 106.

The cloud computing system 100 further includes an identifier management system 114. The identifier management system 114 is an electronic management system that tracks the identifiers of the computing system 100 and records lifecycle information pertaining to the identifiers. The identifier management system 114 also receives requests for identifiers from the client 110 and determines if an identifier is available for allocation to the client 110.

While the computing system 100 is illustrated as a cloud computing system, it is to be understood that the computing system 100 is not limited to cloud computing systems and can include any suitable type of computing system. It is to be understood that the block diagram of FIG. 1 is not intended to indicate that the computing system 100 is to include all of the components shown in FIG. 1 in every case. Further, any number of additional components can be included within the computing system 100, depending on the details of the specific implementation.

Figure 2:
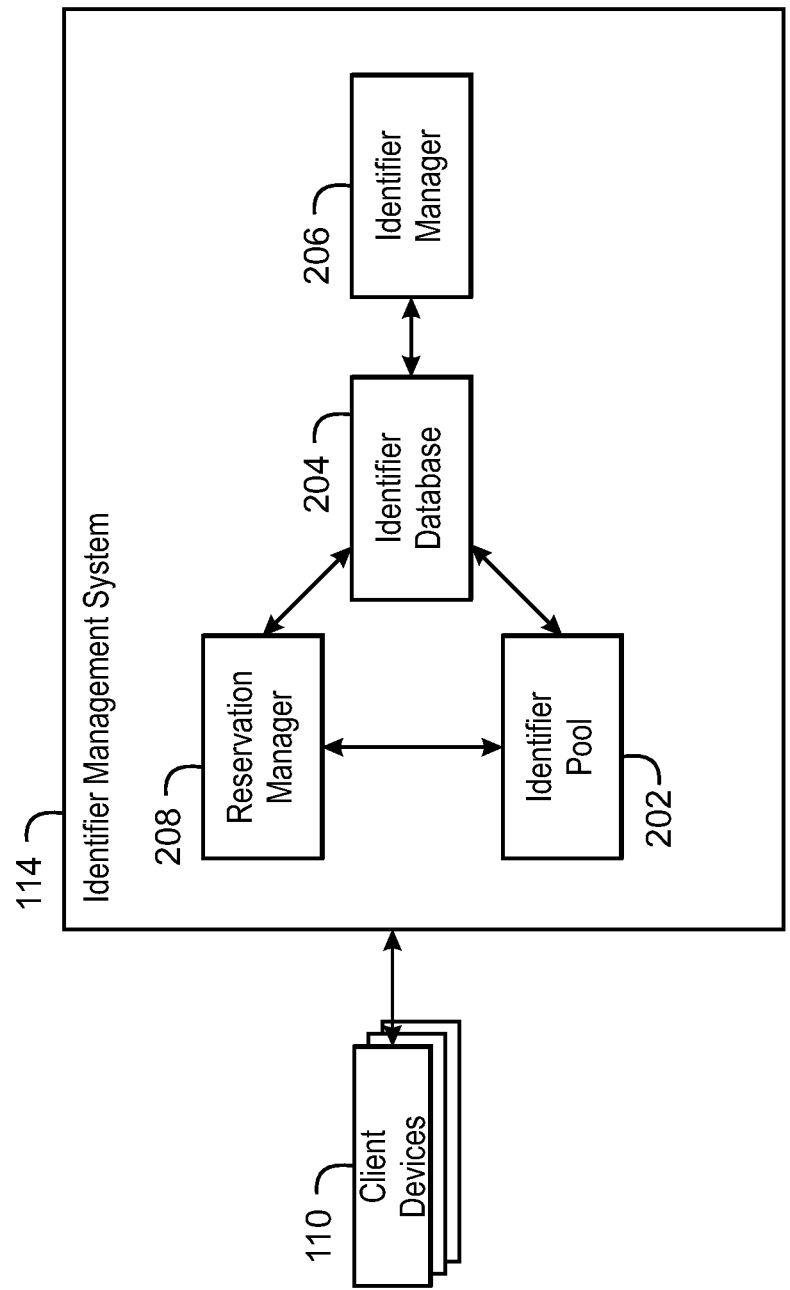
FIG. 2 is a block diagram of an example of an identifier management system.

FIG. 2 is a block diagram of an example of an identifier management system 114. The identifier management system 114 can be an electronic system designed to operate automatically without depending on a human operator. The identifier management system 114 includes an identifier pool 202. The identifier pool includes a plurality of identifiers of the computing system. For example, the identifier pool can include product keys for a variety of products, DNS host names, VLAN Tags, IP Addresses, etc. Identifiers can be pre-propagated (i.e., created before a request is made for the identifier) or an identifier can be created in order to fulfill a request for the identifier. As such, the identifier pool may not include all of the identifiers of the computing system. For example, the identifier pool can include all pre-propagated identifiers, but not include identifiers created to fulfill a particular request.

The identifier management system 114 also includes an identifier database 204. The identifier database stores all information about each of the identifiers in a computing system. The information can include lifecycle information of each identifier, including creation, deletion, allocation, release, and re-use, as well as any additional information about each identifier.

The identifier database 204 is managed by an identifier manager 206. The identifier manager 206 updates the identifier information in the identifier database 204 whenever a change is made to an identifier. For example, the identifier manager 206 can automatically update the identifier database 204 when a change to the lifecycle of an identifier is detected. By updating the identifier database 204 whenever a change is made to an identifier, the state of a particular identifier at any given time is known.

The identifier management system 114 additionally includes a reservation manager 208. The reservation manager 208 receives requests from a client 110 for an identifier. The request can be a request for a particular identifier or the request can be for any available identifier of a particular type. The request includes the period of time for which the identifier is to be used. The reservation manager 208 accesses the identifier database 204 to determine if the identifier exists and is available for the period of time. If the identifier is available for the period of time, the reservation manager 208 returns an affirmative response to the client 110, assigning the identifier to the client 110 for the requested period of time. If the identifier is not available for the period of time, for example, if a previous reservation of the resource for part or all of the period of time is in the identifier database 204, a denial of the request is returned to the client 110.

For example, a client 110 can request a license key for a piece of software. The reservation manager 208 can access the identifier database 204 to determine if a license key for the software exists and is available. If a license key is available, the reservation manager 208 can assign the license key to the client 110 for the period of time listed in the request. For example, a product key can be included in a pool of available product keys that are assigned as a request to access the identifier is granted. The identifier database 204 can be updated when the license key is assigned to the client 110. In another example, a license key can be created "on-the-fly" in response to a reservation and deleted when the reservation ends, or recycled as a reservation ends and a new reservation is activated. The identifier database 204 is updated when the license key is created, updated again when the license key is assigned to a client 110, and updated yet again when the license key is deleted or recycled. In an example, a limited number of license keys can exist for a particular piece of software. When all of the license keys are assigned to clients 110, a request to access the identifier is denied until a license key becomes available. A license key can become available when a reservation period ends or when a client 110 sends a request to return/release an identifier before the reservation period ends.

It is to be understood that the block diagram of FIG. 2 is not intended to indicate that the identifier management system 200 is to include all of the components shown in FIG. 2 in every case. Further, any number of additional components can be included within the identifier management system 200, depending on the details of the specific implementation.

Figure 3:
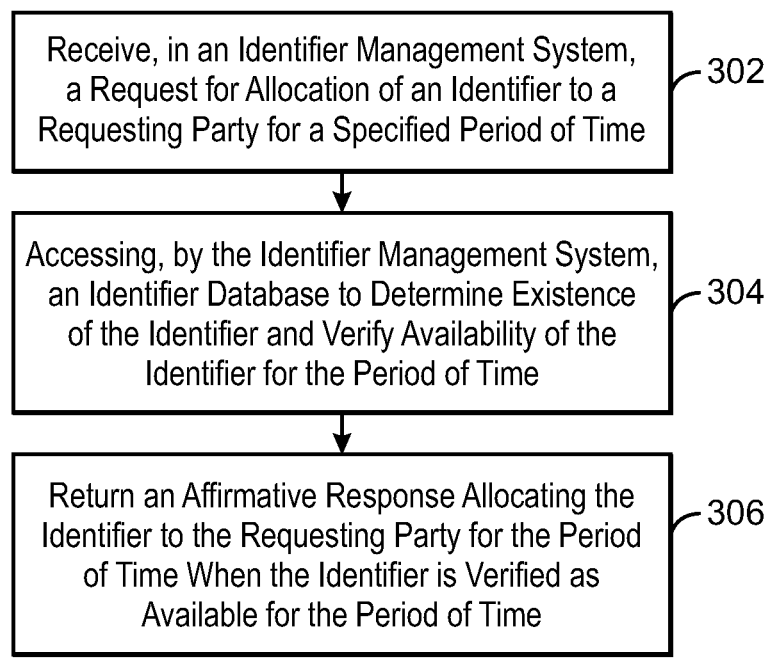
FIG. 3 is a process flow diagram of an example of a method of managing identifiers in a computing system.

FIG. 3 is a process flow diagram of an example of a method of managing identifiers in a computing system. The method can begin at block 302 with receiving, in an identifier management system, a request for an identifier. The identifier can be any type of identifier, such as a product key, a DNS Host name, a VLAN tag, an IP Address, a Virtual Machine Name, a LUN name, or any other type of identifier. The request can include the length of time for which the identifier is requested.

At block 304, the identifier management system can verify availability of the identifier. In order to verify the identifier availability, the identifier management system can access an identifier database. The identifier database stores information about the lifecycle of each identifier in the computing system. The information includes creation, deletion, allocation, release, and re-allocation of the identifiers.

At block 306, the identifier management system can return a response to the requesting party. If the identifier is available, an affirmative response is returned to the requesting party. If the identifier is not available, a denial of the request is returned to the requesting party.

It is to be understood that the process flow diagram of FIG. 3 is not intended to indicate that the method 300 is to include all of the components shown in FIG. 3 in every case. Further, any number of additional blocks can be included within the method 300, depending on the details of the specific implementation.

Figure 4:
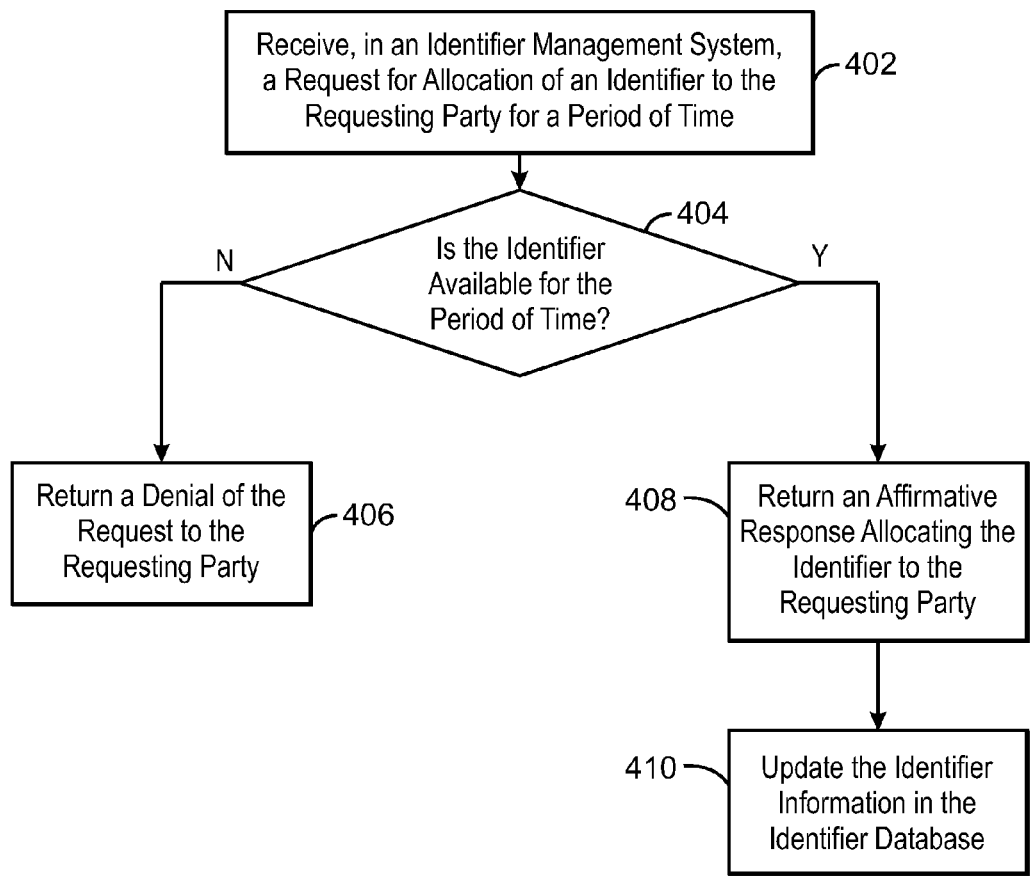
FIG. 4 is a process flow diagram of an example of a method of managing identifiers in a computing system.

FIG. 4 is a process flow diagram of an example of a method of managing identifiers in a computing system. The method 400 can begin at block 402 with receiving, in an identifier management system, a request for an identifier for a period of time. The identifier can be any type of identifier, such as a product key, a DNS Host name, a VLAN tag, an IP Address, a Virtual Machine Name, a LUN name, or any other type of identifier.

At block 404, the identifier management system can determine if the identifier is available for the period of time. In order to determine availability of the identifier, the identifier management system can access an identifier database. The identifier database stores information about the lifecycle of each identifier in the computing system. The information includes creation, deletion, allocation, release, and re-allocation of the identifiers. The identifier database is updated whenever a change is made to an identifier in the computing system.

If the identifier is not available for the period of time, at block 406 a denial of the request can be returned to the requesting party. If the identifier is available for the period of time, at block 408 an affirmative response can be returned to the requesting party, assigning the identifier to the requesting party for the requested period of time. At block 410, the identifier information in the identifier management system can be updated to reflect the assignment of the identifier to the requesting party.

It is to be understood that the process flow diagram of FIG. 4 is not intended to indicate that the method 400 is to include all of the components shown in FIG. 4 in every case. Further, any number of additional blocks can be included within the method 400, depending on the details of the specific implementation.

Figure 5:
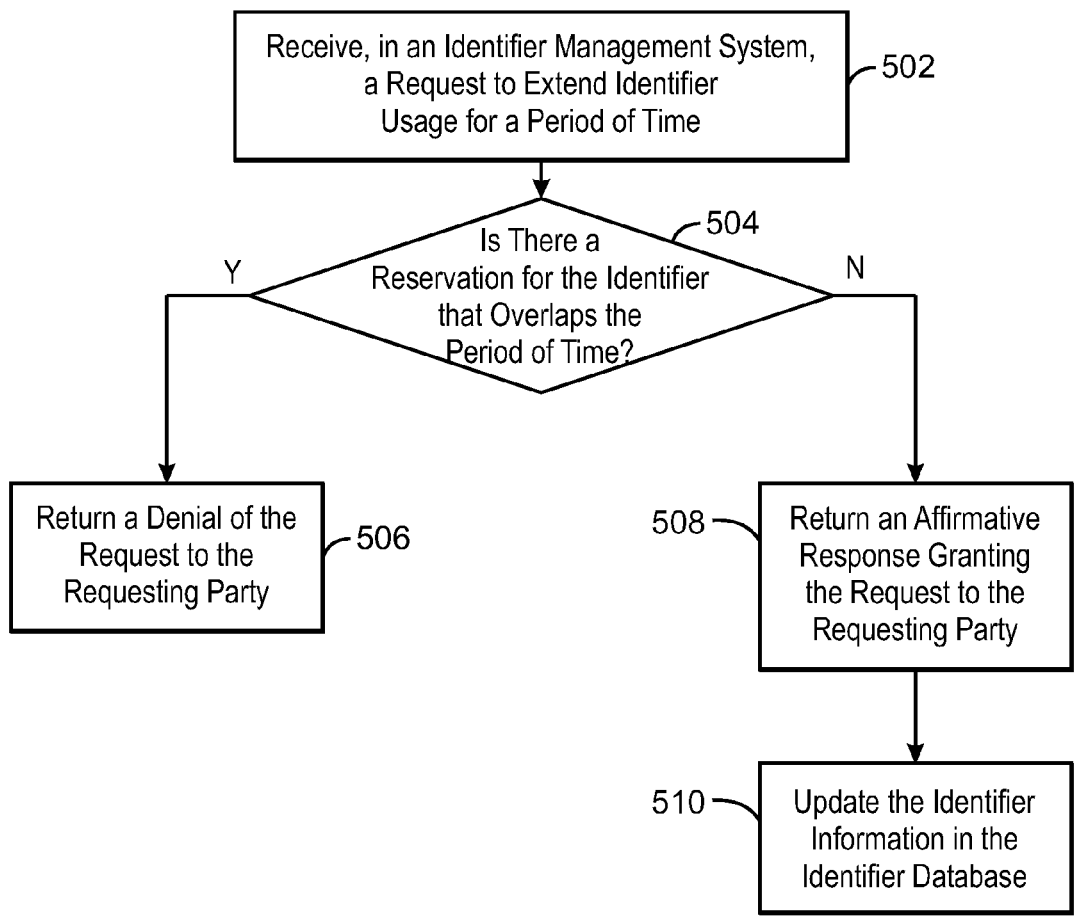
FIG. 5 is a process flow diagram of an example of a method of managing identifiers in a computing system.

FIG. 5 is a process flow diagram of an example of a method of managing identifiers in a computing system. The method 500 can begin at block 502 with receiving, in an identifier management system, a request to extend identifier usage for a period of time.

At block 504, the identifier management system can determine if there is a reservation for the identifier that overlaps the period of time. In order to determine if there is a reservation for the identifier, the identifier management system can access an identifier database.

If there is a reservation that overlaps the period of time, at block 506 the identifier management system can return a denial of the request to the requesting party. If there is not a reservation that overlaps the period of time, at block 508 an affirmative response can be returned to the requesting party. At block 510, the identifier information in the identifier management system can be updated.

It is to be understood that the process flow diagram of FIG. 5 is not intended to indicate that the method 500 is to include all of the components shown in FIG. 5 in every case. Further, any number of additional blocks can be included within the method 500, depending on the details of the specific implementation.

Figure 6:
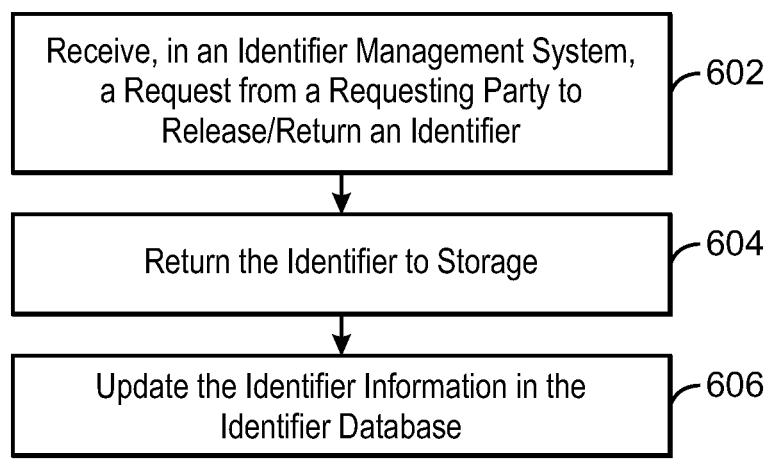
FIG. 6 is a process flow diagram of an example of a method of managing identifiers in a computing system.

FIG. 6 is a process flow diagram of an example of a method of managing identifiers in a computing system. The method 600 can begin at block 602 with receiving, in an identifier management system, a request to release/return an identifier. A requesting party can request to release/return an identifier for any suitable reason.

At block 604, the identifier can be returned to storage. The identifier can be returned to storage until the identifier is re-assigned in response to a new request. In this way, identifiers can be recycled. Alternatively, an identifier can be deleted upon return/release. For example, an identifier generated in response to a request can be deleted upon release of the identifier by the requesting party. At block 606, the identifier information in the identifier management system can be updated. For example, the identifier information can be updated to indicate the release of the identifier and the availability of the identifier for re-allocation or deletion of the identifier.

It is to be understood that the process flow diagram of FIG. 6 is not intended to indicate that the method 600 is to include all of the components shown in FIG. 6 in every case. Further, any number of additional blocks can be included within the method 600, depending on the details of the specific implementation.

Figure 7:
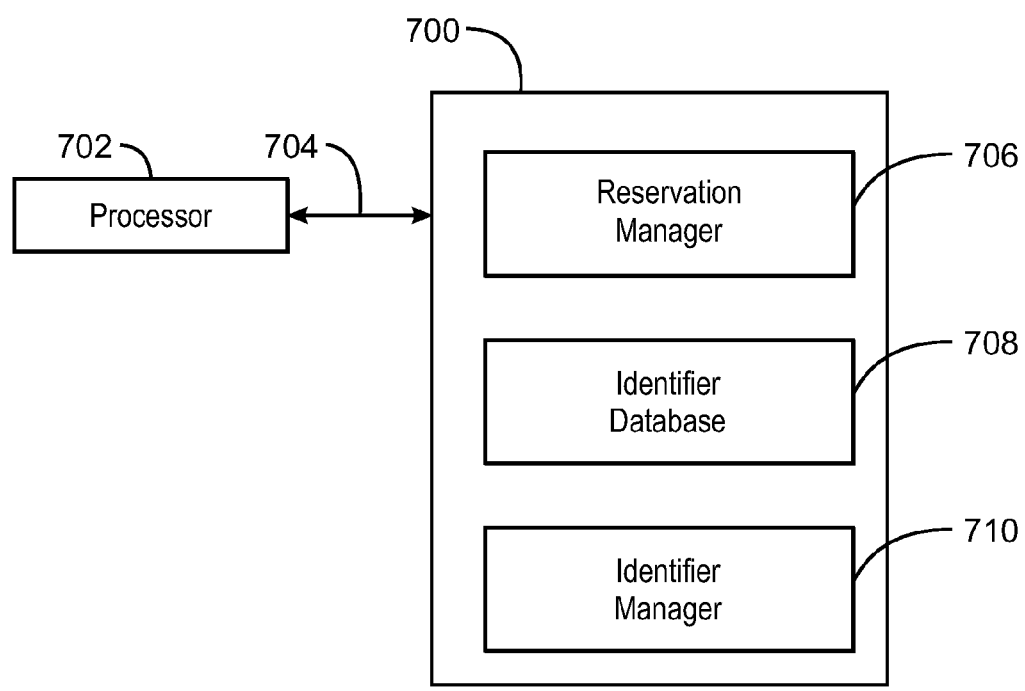
FIG. 7 is a block diagram of an example of a system for managing identifiers in a computing system.

FIG. 7 is a block diagram of an example of a system for managing identifiers in a computing system. The tangible, non-transitory, computer-readable medium is referred to by the reference number 700. The tangible, non-transitory, computer-readable medium 700 can comprise RAM, a hard disk drive, an array of hard disk drives, an optical drive, an array of optical drives, a non-volatile memory, a universal serial bus (USB) drive, a digital versatile disk (DVD), or a compact disk (CD), among others. The tangible, non-transitory, computer-readable medium 700 can be accessed by a processor 702 over a computer bus 704. Furthermore, the tangible, non-transitory, computer-readable medium 400 can include code configured to direct the processor 702 to perform the methods described herein.

As shown in FIG. 7, the various components discussed herein can be stored on the non-transitory, computer-readable medium 700. A first region 706 on the tangible, non-transitory, computer-readable medium 700 can include a reservation manager for managing requests for identifiers. A region 708 can include an identifier database for storing information identifier lifecycle information. A region 710 can include an identifier manager to manage the identifier database and the information therein. Although shown as contiguous blocks, the software components can be stored in any order or configuration. For example, if the tangible, non-transitory, computer-readable medium 700 is a hard drive, the software components can be stored in non-contiguous, or even overlapping, sectors.

It is to be understood that the block diagram of FIG. 7 is not intended to indicate that the storage medium 700 is to include all of the components shown in FIG. 7 in every case. Further, any number of additional components can be included within the storage medium 700, depending on the details of the specific implementation.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A method for managing identifiers, comprising:
   receiving, in an electronic identifier management system, a request for allocation of an identifier to a requesting party for a specified period of time;
   accessing, by the identifier management system, an identifier database to determine existence of the identifier and verify availability of the identifier for the period of time; and
   returning an affirmative response allocating the identifier to the requesting party for the period of time when the identifier is verified as available for the period of time.

2. The method of claim 1, further comprising:
   receiving, in the identifier management system, a request to extend identifier usage for a time period;

checking, by the identifier management system, the identifier database for reservations for the identifier that overlap the time period; and returning a response to the requesting party.

3. The method of claim 2, wherein the response is an affirmative response granting the request when no reservations overlap the time period and the response is a denial of the request when a reservation overlaps the time period.

4. The method of claim 1, further comprising:
receiving, in the identifier management system a request to return an identifier; and
returning an identifier to storage for re-allocation.

5. The method of claim 4, wherein the identifier comprises a product key, a license key, a domain name system (DNS) Host name, a virtual local area network (VLAN) tag, an IP address, a virtual machine name, a logical unit number (LUN) name, or a combination thereof.

6. The method of claim 1, wherein the computing system is a cloud computing system.

7. An electronic system for identifier management, comprising:
a reservation manager to manage a request from a client for an identifier and to verify availability of the identifier;
a database to store lifecycle information of identifiers in a computing system; and
an identifier manager to manage the database,
wherein upon receiving the request from the client, the reservation manager accesses the database to verify availability of the identifier and returns to the client a response to the request based on the information received from the database.

8. The system of claim 7, wherein the lifecycle information comprises creation, deletion, allocation, release, re-allocation, or a combination thereof of an identifier.

9. The system of claim 7, wherein the identifier manager automatically updates the database when a change is made to an identifier.

10. The system of claim 7, wherein the identifier is one of a domain name system (DNS) Host name, a virtual local area network (VLAN) tag, an IP address, a virtual machine name, a logical unit number (LUN) name, or a license key.

11. The system of claim 7, wherein the reservation manager accesses the database to determine availability of the identifier.

12. The system of claim 7, wherein the reservation manager returns an affirmative response granting the request when the identifier is available and the reservation manager returns a denial of the request when the identifier is not available.

13. The system of claim 12, wherein when the reservation manager returns an affirmative response, the identifier manager updates the identifier database to reflect allocation of the identifier to a requesting party for a requested period of time.

14. The system of claim 7, wherein the identifier management system manages identifiers in a cloud computing system.

15. A tangible, non-transitory, computer-readable storage medium, comprising code for identifier management that, when executed, causes a processor to:
receive a request for assignment of an identifier to a requesting party for a specified period of time;
access an identifier database to determine existence of the identifier and verify availability of the identifier for the period of time; and
return an affirmative response allocating the identifier to the requesting party for the period of time when the identifier is verified as available for the period of time.

16. The tangible, non-transitory, computer-readable storage medium of claim 15, wherein the response is an affirmative response granting the request when the identifier is available for the period of time and the response is a denial of the request when the response is not available for the period of time.

17. The tangible, non-transitory, computer-readable storage medium of claim 15, wherein the code further causes the processor to:
receive a request from the requesting party to extend identifier usage for a time period;
check the identifier database for reservations for the identifier that overlap the time period; and
return a response to the requesting party.

18. The tangible, non-transitory, computer-readable storage medium of claim 17, wherein the response is an affirmative granting the request when no reservations overlap the period of time and the response is a denial of the request when a reservation overlaps the period of time.

19. The tangible, non-transitory, computer-readable storage medium of claim 15, wherein the code further causes the processor to:
receive a request from the requesting party to return an identifier; and
return the identifier to storage.

20. The tangible, non-transitory, computer-readable storage medium of claim 19, wherein the identifier is re-allocated in response to a new request for the identifier.

* * * * *